US012591410B2

(12) United States Patent (10) Patent No.: US 12,591,410 B2

Zhang et al. (45) Date of Patent: Mar. 31, 2026

(54) DATA PROCESSING METHOD FOR PROCESSING UNIT, ELECTRONIC DEVICE AND COMPUTER READABLE STORAGE MEDIUM

(71) Applicant: Shanghai Biren Technology Co., Ltd, Shanghai (CN)

(72) Inventors: YuFei Zhang, Shanghai (CN); Dacheng Liang, Shanghai (CN)

(73) Assignee: Shanghai Biren Technology Co., Ltd., Shanghai (CN)

( * ) Notice: Subject to any disclaimer, the term of this patent is extended or adjusted under 35 U.S.C. 154(b) by 976 days.

(21) Appl. No.: 17/690,014

(22) Filed: Mar. 9, 2022

(65) Prior Publication Data

US 2022/0291901 A1 Sep. 15, 2022

(30) Foreign Application Priority Data

Mar. 9, 2021 (CN) .......................... 202110258250.5

(51) Int. Cl.
| | |
|---|---|
| *G06F 7/483* | (2006.01) |
| *G06F 7/544* | (2006.01) |
| *G06F 17/16* | (2006.01) |

(52) U.S. Cl.
CPC ............. *G06F 7/483* (2013.01); *G06F 7/5443* (2013.01); *G06F 17/16* (2013.01)

(58) Field of Classification Search
CPC ............................................... G06F 7/48–4833
See application file for complete search history.

(56) References Cited

U.S. PATENT DOCUMENTS

2021/0349694 A1* 11/2021 Ulrich ...................... G06F 7/483
2022/0269753 A1* 8/2022 Finch ...................... G06F 7/483
(Continued)

FOREIGN PATENT DOCUMENTS

WO WO-2020191417 A2 * 9/2020 ............. G06F 7/483

OTHER PUBLICATIONS

Gilani, Syed Zohaib et al. "Energy-efficient floating-point arithmetic for digital signal processors." 2011 Conference Record of the Forty Fifth Asilomar Conference on Signals, Systems and Computers (ASILOMAR) (2011): 1823-1827. (Year: 2011).*
(Continued)

*Primary Examiner* — James Trujillo
*Assistant Examiner* — Markus Anthony Villanueva
(74) *Attorney, Agent, or Firm* — JCIP GLOBAL INC.

(57) ABSTRACT

Embodiments of the present disclosure relate to a method for data processing and to the field of computers. The method comprises: in the $m^{th}$ clock cycle, determining a first exponent value; in the $m+1^{th}$ clock cycle, inputting two n-dimensional vectors into the processing unit to determine n second exponent values; determining a maximum value among the first exponent value and the determined n second exponent values; determining whether a target second exponent value exists among the n second exponent values, an absolute value of a difference between the target second exponent value and the maximum value being greater than or equal to a first threshold; and in response to determining that the target second exponent value exists in n second exponent values, not performing a multiply operation of two floating point numbers corresponding to the target second exponent value in the processing unit, during the $m+1^{th}$ clock cycle.

8 Claims, 3 Drawing Sheets

(56)    References Cited

U.S. PATENT DOCUMENTS

2023/0297337 A1 *   9/2023  Mohamed Awad  ... G06N 3/045
                                                      708/501
2025/0348278 A1 *  11/2025  Ravgad .............. G06F 15/8046

OTHER PUBLICATIONS

A. Hagiescu, M. Langhammer, B. Pasca, P. Colangelo, J. Thong and N. Ilkhani, "BFLOAT MLP Training Accelerator for FPGAs," 2019 International Conference on ReConFigurable Computing and FPGAs (ReConFig), Cancun, Mexico, 2019, pp. 1-5. (Year: 2019).*

Deierling, Kevin. "What Is a DPU? . . . And what's the difference between a DPU, a CPU and a GPU?". May 20, 2020. Nvidia. https://blogs.nvidia.com/blog/whats-a-dpu-data-processing-unit/ (Year: 2020).*

Patterson, David A., Hennessy, John L. 2012. Computer Architecture, Fifth Edition: A Quantitative Approach (5th. ed.). Morgan Kaufmann Publishers Inc., San Francisco, CA, USA. (Year: 2012).*

* cited by examiner

DATA PROCESSING METHOD FOR PROCESSING UNIT, ELECTRONIC DEVICE AND COMPUTER READABLE STORAGE MEDIUM

CROSS-REFERENCE TO RELATED APPLICATION

This application claims the priority benefit of China application serial no. 202110258250.5, filed on Mar. 9, 2021. The entirety of the above-mentioned patent application is hereby incorporated by reference herein and made a part of this specification.

BACKGROUND

Technical Field

Embodiments of the present disclosure relate to the field of information processing, and particularly to a data processing method for a processing unit, an electronic device, and a computer-readable storage medium.

Description of Related Art

A General matrix multiply (GEMM) arithmetic logic unit (ALU) plays a central role in large computationally intensive computations, such as various AI applications. A systolic array has become the newest implementation for large scale GEMM ALU. In a basic processing unit of the systolic array, a fused multiply and add operation, i.e., a dot product operation of two vectors, is typically performed. In order to implement the fused multiply and add operation in each basic processing unit, a lot of multiply operations and add operations of these multiplication results need to be performed in the basic processing unit.

It is difficult for a traditional data processing solution for the processing units to effectively solve the design bottleneck of high power consumption of large scale systolic arrays.

SUMMARY

The present disclosure provides a data processing method for a processing unit, an electronic device, and a computer-readable storage medium, which can effectively save the computing resources of the processing unit (especially a systolic array-based processing unit) and reduce the power consumption of an arithmetic operation unit.

According to a first aspect of the present disclosure, there is provided a data processing method for a processing unit, comprising: in the $m^{th}$ clock cycle, determining a first exponent value of a floating point number as a result of a first dot product operation performed in the processing unit, where m is a positive integer greater than or equal to 1; in the $m+1^{th}$ clock cycle, inputting two n-dimensional vectors into the processing unit to determine n second exponent values, the second exponent values being obtained by adding the exponent of a floating point number in one of the two n-dimensional vectors with the exponent of a corresponding floating point number in the other of the two n-dimensional vectors, n being a positive integer greater than or equal to 1; determining a maximum value among the first exponent value and the determined n second exponent values; determining whether a target second exponent value exists among the n second exponent values, an absolute value of a difference between the target second exponent value and the maximum value being greater than or equal to a first threshold; and in response to determining that the target second exponent value exists in n second exponent values, not performing a multiply operation of two floating point numbers corresponding to the target second exponent value in the processing unit, during the $m+1^{th}$ clock cycle.

According to a second aspect of the present disclosure, there is provided an electronic device comprising: a processor; and a memory coupled to the processor, the memory having instructions stored therein that, when executed by the processor, cause the electronic device to perform acts comprising: in the $m^{th}$ clock cycle, determining a first exponent value of a floating point number as a result of a first dot product operation performed in the processing unit, where m is a positive integer greater than or equal to 1; in $m+1^{th}$ clock cycle, inputting two n-dimensional vectors into the processing unit to determine n second exponent values, the second exponent values being obtained by adding the exponent of a floating point number in one of the two n-dimensional vectors with the exponent of a corresponding floating point number in the other of the two n-dimensional vectors, n being a positive integer greater than or equal to 1; determining a maximum value among the first exponent value and the determined n second exponent values; determining whether a target second exponent value exists among the n second exponent values, an absolute value of a difference between the target second exponent value and the maximum value being greater than or equal to a first threshold; and in response to determining that the target second exponent value exists in n second exponent values, not performing a multiply operation of two floating point numbers corresponding to the target second exponent value in the processing unit, during the $m+1^{th}$ clock cycle.

According to a third aspect of the present disclosure, there is provided a computer-readable storage medium having computer instructions stored thereon, the computer instructions, when executed by a machine, implementing the method according to the first aspect of the present disclosure.

According to one embodiment of the present disclosure, in response to determining that the target second exponent value does not exist among the n second exponent values, the multiply operation may be performed for all data in the two n-dimensional vectors in the processing unit, during the $m+1^{th}$ clock cycle.

According to one embodiment of the present disclosure, the processing unit may include a register; and an absolute value of a difference between the first threshold and the number of bits of the mantissa of the floating point number stored in the register may be smaller than a second threshold.

According to one embodiment of the present disclosure, the first exponent value may be obtained in the following manner: in the $m^{th}$ clock cycle, inputting the first n-dimensional vector and second n-dimensional vector into the processing unit to perform a first dot product operation to obtain a floating point number of a first dot product operation result; performing normalization processing for the floating point number of the first dot product operation result to obtain the first exponent value.

According to an embodiment of the present disclosure, the performing a first dot product operation to obtain a floating point number of a first dot product operation result may comprise: multiplying i data from the first n-dimensional vector with corresponding i data from the second n-dimensional vector, respectively, to obtain i floating point numbers, where i=0, 1, 2 . . . n;

performing exponent matching processing on at least two floating point numbers among the i floating point numbers and the floating point numbers obtained by the dot product operation in the $m-1^{th}$ clock cycle; summing the exponent matching processed floating point numbers, to obtain a floating point number of the first dot product operation result in the $m^{th}$ clock cycle.

According to one embodiment of the present disclosure, the exponent value of the floating-point number of the result of the operation performed in the $m+1^{th}$ clock cycle may be determined as the first exponent value for comparison with the n second exponent values determined in the $m+2^{th}$ clock cycle.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

The above and other features, advantages and aspects of various embodiments of the present disclosure will become more apparent by reading through the following detailed depictions with reference to figures. In the figures, the same or like reference numbers denote the same or like elements, wherein.

DESCRIPTION OF THE EMBODIMENTS

Figure 1:
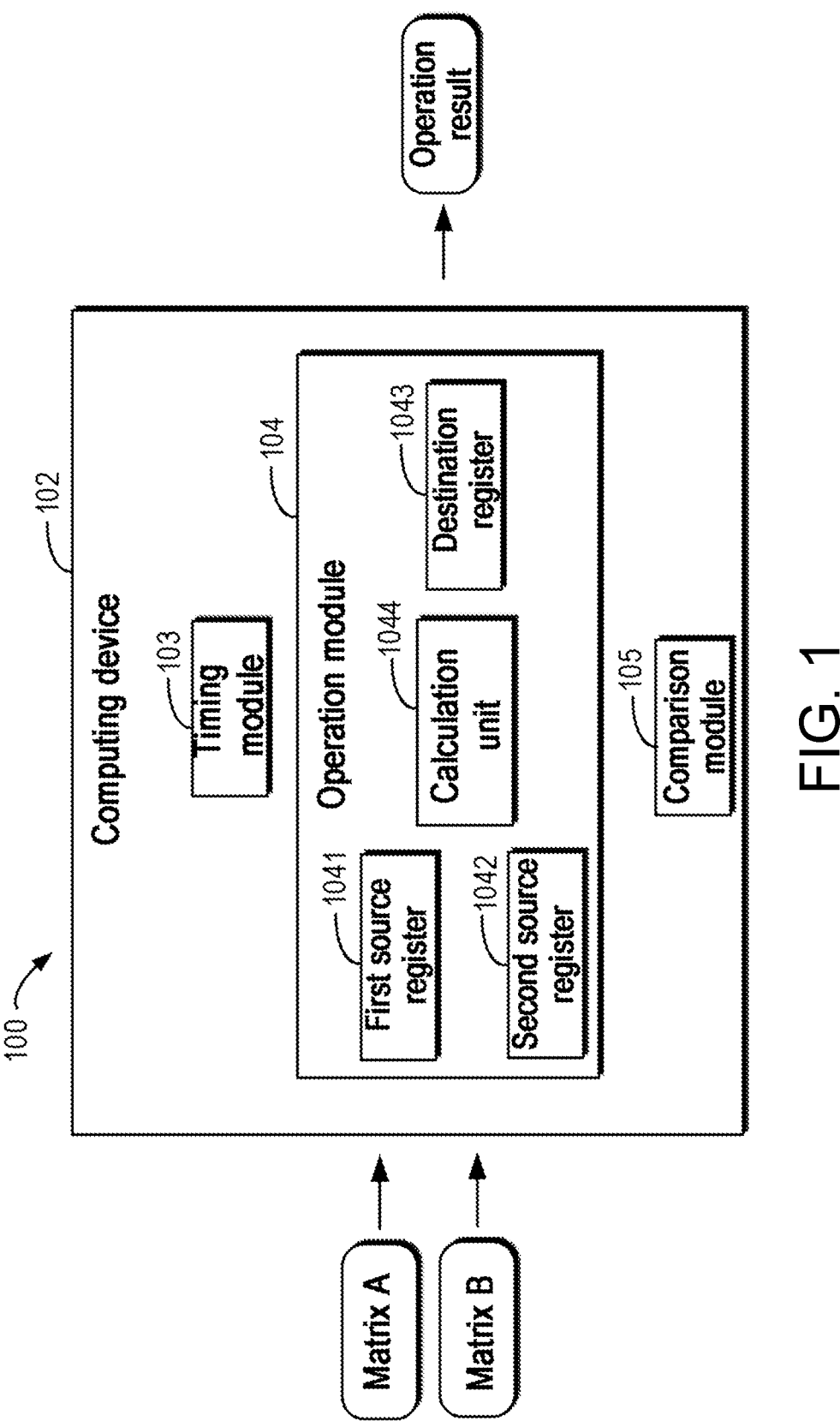
FIG. 1 illustrates a schematic diagram of an example environment in which a plurality of implementations of the present disclosure can be implemented.

Embodiments of the present disclosure will be described as follows in greater detail with reference to the drawings. Although some embodiments of the present disclosure are illustrated in the drawings, it is to be understood that the present disclosure described herein can be implemented in various manners, and the present disclosure should not be construed as being limited to the embodiments illustrated herein. Rather, these embodiments are provided to enable thorough and complete understanding of the present disclosure. It is to be understood that the drawings and embodiments of the present disclosure are only for exemplary purposes, and are not intended to limit the protection scope of the present disclosure.

In the depictions of the embodiments of the present disclosure, the term "includes" and its variants are to be read as open-ended terms that mean "includes, but is not limited to." The term "based on" is to be read as "based at least in part on." The term "an embodiment" and "the embodiment" are to be read as "at least one embodiment." Terms "a first", "a second" and others can denote different or identical objects. The following text may also contain other explicit or implicit definitions.

As stated above, a General matrix multiply (GEMM) arithmetic logic unit (ALU) plays a central role in various AI applications. A systolic array has become the newest implementation mode of large scale GEMM ALU. The systolic array usually includes n×n processing units, and a dot product operation of an n-dimensional vector and another n-dimensional vector is performed in each processing unit, that is, n data of an n-dimensional vector respectively multiply n data of another n-dimensional vector to obtain n multiplication results, and an add operation is performed on the n multiplication results. When the value of n is large, i.e., when the scale of the systolic array is large, it is necessary to implement the fused multiply and add operation in each basic processing unit in each clock cycle, thus causing a large consumption of computing resources and power, which becomes the bottleneck in the design of the arithmetic logic unit.

In view of the above-mentioned disadvantages of the arithmetic logic unit, it is desirable to provide a data processing method capable of reducing the power consumption of the processing unit. The present disclosure provides a solution for data processing for a processing unit. The data processing method includes: in the $m^{th}$ clock cycle, determining a first exponent value of a floating point number as a result of a first dot product operation performed in the processing unit, where m is a positive integer greater than or equal to 1; in $m+1^{th}$ clock cycle, inputting two n-dimensional vectors into the processing unit to determine n second exponent values, the second exponent values being obtained by adding the exponent of a floating point number in one of the two n-dimensional vectors with the exponent of a corresponding floating point number in the other of the two n-dimensional vectors, n being a positive integer greater than or equal to 1; determining a maximum value among the first exponent value and the determined n second exponent values; determining whether a target second exponent value exists among the n second exponent values, an absolute value of a difference between the target second exponent value and the maximum value being greater than or equal to a first threshold; and in response to determining that the target second exponent value exists in n second exponent values, not performing a multiply operation of two floating point numbers corresponding to the target second exponent value in the processing unit, during the $m+1^{th}$ clock cycle.

According to the solution of the present disclosure, before the dot product operation is performed on data of next clock cycle of two adjacent clock cycles, it is determined as to whether the target second exponent value exists in advance, and when it is determined that the target second exponent value exists, the processing unit is caused not to perform the multiply operation of two floating point numbers corresponding to the target second exponent value in the next clock cycle, thereby skipping the multiply operation on data not necessarily to be performed. Since in the next clock cycle, operation is only performed on part of data and the operation is not necessarily performed on all data, so the computing resources can be significantly saved, and the power consumption of the arithmetic operation unit can be reduced.

Embodiments of the present disclosure will be described in detail below with reference to the accompanying drawings.

Example Environment

FIG. 1 illustrates a schematic diagram of an example environment 100 in which a plurality of implementations of the present disclosure can be implemented. A computing device 102 in the example environment 100 may be any device with a computing capability. As a non-limiting example, the computing device 102 may be any type of stationary computing device, mobile computing device or portable computing device, including but not limited to a desktop computer, a laptop computer, a notebook computer, a netbook computer, a tablet computer, a multimedia computer, a mobile phone, etc. All or a portion of the components of the computing device 102 may be distributed in the cloud.

In the example environment 100, the computing device 102 includes or is deployed with a timing module 103, an operation module 104 and a comparison module 105. The computing device 102 is a systolic array-based processing unit. The matrices A and B to be processed are input into the computing device 102. After the matrices A and B are processed by the computing device 102, results of the multiply-add operation of the data in the matrix A and the matrix B are output. The actions described below with respect to the computing device 102 may be specifically performed by the timing module 103, the operation module 104 and the comparison module 105.

The operation module 104 may include a first source register 1041, a second source register 1042, a destination register 1043 and a calculation unit 1044. The first source register 1041 is configured to store data to be input into the calculation unit 1044 and the second source register 1042 is configured to store other data to be input into the calculation unit 1044. The destination register 1043 is used to store a calculation result of the calculation unit 1044. In one embodiment, the calculation result may be stored in the form of a floating point number, and a mantissa of the floating point number has a certain number of bits, for example, but not limited to 16 bits. The number of bits of the mantissa of the floating point number stored in the destination register 1043 can be changed according to actual artificial intelligence application situations. The calculation unit 1044 is configured to perform a multiply-add operation of the data, that is, the dot product operation described above.

The timing module 103 may be configured to send a clock control signal to the first source register 1041 and the second source register 1042, so that in the first clock cycle, the first source register 1041 inputs a first vector into the calculation unit 1044, and the second source register 1042 inputs a second vector into the calculation unit 1044; and in the second clock cycle, the first source register 1041 inputs a third vector into the calculation unit 1044, and the second source register 1042 inputs a fourth vector input into the calculation unit 1044. In an embodiment of the present disclosure, each vector may be an n-dimensional vector, including n data, the data may be floating point numbers, and n is a positive integer greater than or equal to 1.

The calculation unit 1044 performs the dot product operation of the first vector and the second vector in the first clock cycle to obtain a first exponent value of the floating point number of the operation result, where the first exponent value is an exponent value after the floating point number of the operation result is normalized. The calculation unit 1044 inputs the first exponent value into the comparison module 105 for subsequent comparison. The third n-dimensional vector and the fourth n-dimensional vector form n data pairs. In the second clock cycle, before the dot product operation of the third n-dimensional vector and the fourth n-dimensional vector is performed, the calculation unit 1044 pre-calculates the sum of exponents of the two floating point numbers of each data pair of the n data pairs, the sum of the exponents is referred to as a second exponent value.

The first vector and third vector may include one or more data from respective rows of matrix A, and the second vector and fourth vector may include one or more data from respective columns of matrix B. The first clock cycle and the second clock cycle are a previous clock cycle and the next clock cycle of the two adjacent clock cycles, respectively, rather than two starting clock cycles among all clock cycles. There are also earlier clock cycles before the first clock cycle and later clock cycles after the second clock cycle.

Since each vector has n data, the corresponding pair of vectors constitutes n data pairs, each data pair includes two floating point numbers, the exponents of the two floating point numbers can be added up to obtain a sum of exponents, and n sums of exponents, namely, n second exponent values, may be obtained with regard to the two n-dimensional vectors. The comparison module 105 is configured to compare the first exponent value of the floating point number as an operation result of the first clock cycle with the n second exponent values of the n data pairs for the second clock cycle to obtain a maximum exponent value, that is to say, to compare the above-mentioned n+1 exponent values to obtain the maximum exponent value among them. The comparison module 105 is further configured to compare the maximum exponent value with the n second exponent values respectively, and omit or skip the multiply operation of two floating point numbers of a data pair corresponding to a certain second exponent value upon determining that the difference between the certain second exponent value and the maximum exponent value is greater than or equal to a first threshold.

In one embodiment, the threshold may be the number of reserved bits of the mantissa of the floating point number stored in destination register 1043. However, those skilled in the art can understand that, in other embodiments, according to the actual application, the threshold may also be another value other than the number of reserved bits for the mantissa of the floating point number stored in the destination register 1043, or a difference between the threshold and the number of bits for the mantissa of the floating point number stored in the destination register 1043 is smaller than a second threshold. The second threshold may vary with actual application situations.

The operations performed by the timing module 103, the operation module 104 and the comparison module 105 will be exemplified below. In this example, in the first clock cycle, the timing module 103 sends a control signal such that the first vector A1=[a0, a1, a2, a3, a4, a5, a6, a7] stored in the first source register 1041 and the second vector B1=[b0, b1, b2, b3, b4, b5, b6, b7] stored in the second source register 1042 are input into the calculation unit 1044. In the calculation unit 1044, the dot product operation of the first vector and the second vector is performed, and Equation (1) of the dot product operation is shown as:

$$A1 \cdot B1 = a0*b0 + a1*b1 + \ldots a7*b7 \qquad \text{Equation (1)}$$

The step of performing the dot product operation includes performing the multiply operation on two floating point numbers of one or more data pairs in the data pairs (a0, b0), (a1, b1), (a2, b2), (a3, b3), (a4, b4), (a5, b5), (a6, b6) and (a7, b7). Here, the process of the dot product operation is explained by performing 8 multiply operations as an example, but the pre-determination which will be described in detail below is also performed in the first clock cycle. In fact, in the first clock cycle, it is possible to only perform the multiply operation of part of data pairs, or not to perform the multiply operation of any data pair, i.e., to skip or omit the multiply operation of part of or all of data pairs.

Since the exponents of the floating point numbers in vector A1 and vector B1 are different, the exponents of the 8 floating point numbers serving as the multiplication results are different. The step of performing the dot product operation further includes performing exponent matching processing on the 8 floating point numbers obtained above. In one embodiment, when the exponent matching processing is performed, two floating point numbers in the 8 floating point numbers may first be subjected to the exponent matching processing to obtain an addition result, and then the exponent matching processing is performed on the addition result and the next floating point number, and then the addition operation is further performed, and so on. The same processing is performed on the addition operations of other floating point numbers to obtain a final result of the addition operations. In order to obtain the above-mentioned first exponent value, namely, the first exponent value to be compared with the eight second exponent values in the next cycle, the result of the dot product operation is normalized, and the exponent value of the normalized floating point number serves as the first exponent value.

In the second clock cycle, the timing module 103 sends a control signal such that the third vector A2=[a8, a9, a10, a11, a12, a13, a14, a15] stored in the first source register 1041 and the fourth vector B2=[b8, b9, b10, b11, b12, b13, b14, b15] stored in the second source register 1042 are input into the calculation unit 1044. The data from the third vector and fourth vector form 8 data pairs (a9, b9), (a9, b9), (a10, b10), (a11, b11), (a12, b12), (a13, b13), (a14, b14) and (a15, b15). For these 8 data pairs, 8 second exponent values can be obtained, and each second exponent value is the sum of the exponents of the two floating point numbers in the pair of data.

In one example, the first exponent value is 64, the number of bits in the mantissa of the floating point number stored in the destination register 1043 is 32 bits, and the second exponent value of one data pair from the third vector and fourth vector in the second clock cycle is 16, thus the maximum value among the first exponent value (which is 64) and the second exponent value (which is 16) is 64, and an absolute value of the difference between the second exponent value and the maximum exponent value is 48>32. Therefore, in the second clock cycle, in the calculation unit 1044, there is no need to perform a multiply operation on the data, i.e., the multiply operation on the data pair is skipped. The reason why no multiply operation is performed on the data pair is as follows: if the number of bits of the mantissa of the floating point number stored in the destination register is 32, and this indicates that when the floating point number of the multiplication result of the data pair (the floating point number with an exponent of 16) is added with the floating point number with an exponent of 64 obtained in the first clock cycle, the floating point number of the multiplication result of the data pair must be shifted by 48 bits, and the number of shifted bits is greater than 32 bits, and the corresponding mantissa of the floating point number after the shift is invisible or zero for the 32-bit mantissa of the floating point number in the register, so the multiplication result of the data pair can be set to 0, that is, the multiply operation of the data pair is not performed.

Example Procedure of Data Processing

Figure 2:
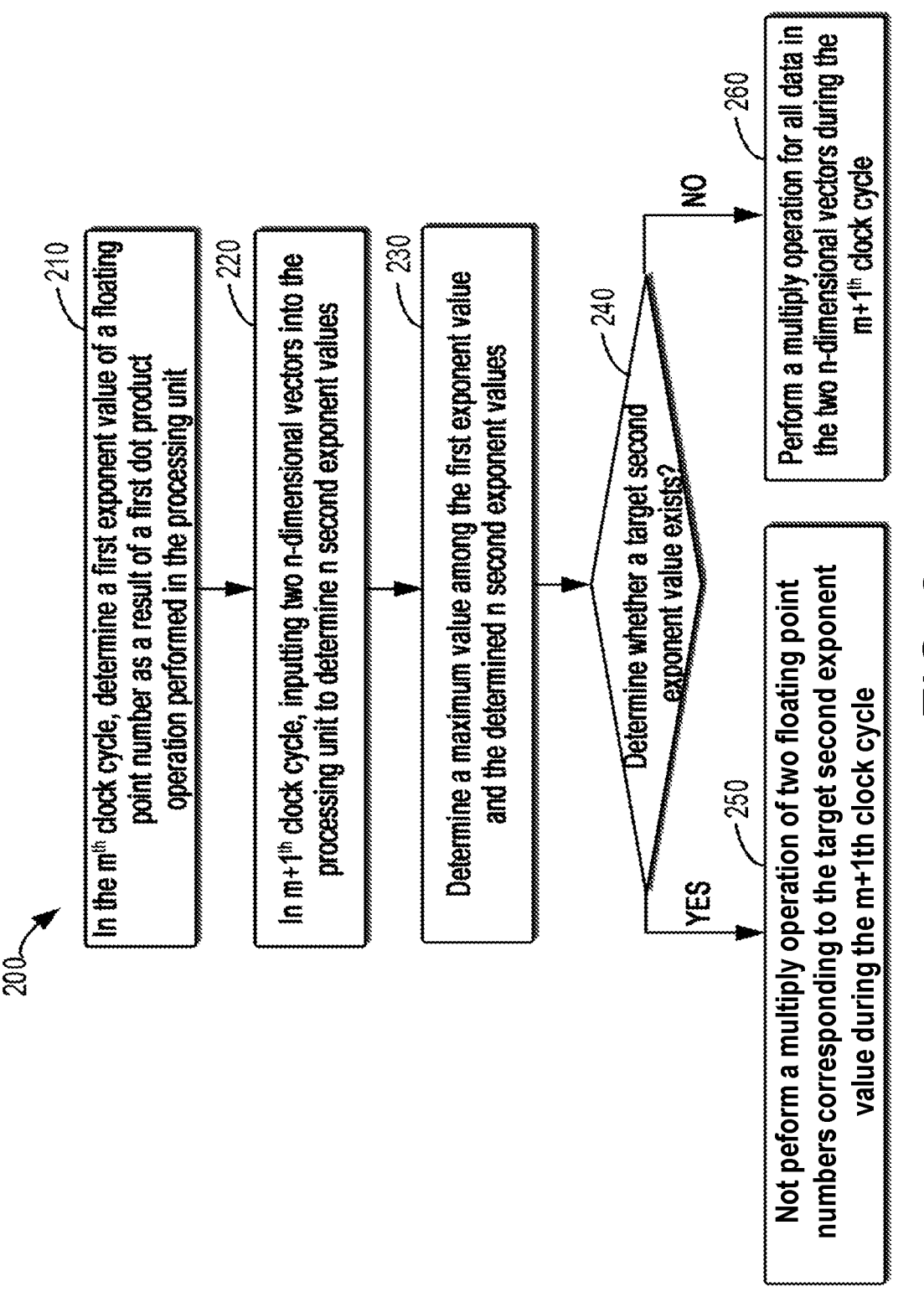
FIG. 2 illustrates a flow chart of a method for data processing according to one embodiment of the present disclosure.

To understand the method for data processing of the systolic array-based processing unit provided by the embodiments of the present disclosure more clearly, the embodiments of the present disclosure will be further described with reference to FIG. 2. FIG. 2 illustrates a flow chart of a process 200 for data processing of a processing unit according to some embodiments of the present disclosure. The process 200 may be implemented by the computing device 102 of FIG. 1. For ease of discussion, the process 200 will be described in with reference to FIG. 1.

At block 210, in the $m^{th}$ clock cycle, the operation module 104 determines a first exponent value of the floating point number as a result of a first dot product operation performed in the processing unit, where m is a positive integer greater than or equal to one. The $m^{th}$ clock cycle is a previous clock cycle in two adjacent clock cycles.

In the $m^{th}$ clock cycle, the timing module 103 sends a clock control signal to the first source register 1041 and the second source register 1042, so that the first source register 1041 inputs the first n-dimensional vector into the calculation unit 1044, and the second source register 1042 inputs the second n-dimensional vector into the calculation unit 1044 for performing the first dot product operation to obtain the floating point number of the result of the first dot product operation. The number of times of multiply operation of the first dot product operation performed in this clock cycle is at most n, the number of data in the first n-dimensional vector or the second n-dimensional vector.

In one embodiment of the present disclosure, the performed first dot product operation includes: multiplying i data from the first n-dimensional vector with corresponding i data from the second n-dimensional vector, respectively, to obtain i floating point numbers, where i=0, 1, 2 . . . n. When i=0, this means that the dot product operation of the input vector needn't be performed in this clock cycle, and then the first dot product operation performed in this clock cycle is to process the floating point number of the operation result in the previous clock cycle. When i=1, 2 . . . n−1, this means that the dot product operation of part of other than all of the data of the input vector is performed in this clock cycle. In this example, the dot product operation performed further includes: performing exponent matching processing on at least two floating point numbers among the obtained i floating point numbers and the floating point numbers obtained by the dot product operation in the $m-1^{th}$ clock cycle. That is to say, the exponent matching processing is performed for the first two numbers in the i+1 floating point numbers to perform the add operation of the floating point numbers. The exponent matching processing is performed for the result of the add operation with the next floating point number, and so on, until the exponent matching processing and the add operation for all floating point numbers are completed. The exponent matching processing includes shifting the mantissa of the floating point number with a smaller exponent based on a larger exponent in the exponents of the two floating point numbers so that the two floating point numbers have the same exponent, and then adding mantissas of the two floating point numbers. In this example, the dot product operation performed further includes: summing the exponent matching processed floating point numbers, to obtain a floating point number of the first dot product operation result in the $m^{th}$ clock cycle. The number of the floating point numbers of the result of a final add operation depends on the operation of the processor. The add operation and the exponent matching processing of floating point numbers are performed in the manner of a CSA tree, which is well known to those skilled in the art and will not be described in detail herein.

In one embodiment of the present disclosure, the first exponent value is obtained by performing normalization processing for the floating point number of the first dot product operation result. If the $j^{th}$ bits after the decimal point of the mantissa of the floating point number are not 1, the mantissa is shifted and the exponent of the floating point number is changed until the $1^{st}$ bit after the decimal point of the mantissa of the floating point number is 1. The above process is the normalization processing. In another embodiment of the present disclosure, in a case where the $1^{st}$ bit after the decimal point of the floating point number obtained by summing the exponent matching processed floating point numbers is 1, the normalization processing needn't be performed for the floating point number obtained from the summing. The normalization processing is well known to those skilled in the art and will not be described in detail herein.

At block 220, in the m+1$^{th}$ clock cycle, two n-dimensional vectors are input into the processing unit to determine n second exponent values. In the m+1$^{th}$ clock cycle, the timing module 103 sends a clock control signal to the first source register 1041 and the second source register 1042, so that the first source register 1041 inputs a third n-dimensional vector into the calculation unit 1044, and the second source register 1042 inputs a fourth n-dimensional vector into the calculation unit 1044. The calculation unit 1044 adds up the exponent of one floating point number in the third n-dimensional vector with the exponent of a corresponding floating point number in the fourth n-dimensional vector to obtain a second exponent value. In the m+1$^{th}$ clock cycle, before the multiply-add operation of the floating point numbers in these vectors is performed, the sum of the exponent of a floating point number from the third n-dimensional vector and the exponent of a corresponding floating point number from the fourth n-dimensional vector are calculated. For example, if a floating point number from the third n-dimensional vector is the 1st floating point number in the vector, then the floating point umber from the fourth n-dimensional vector should also be the 1st floating point number in the fourth n-dimensional vector. Each floating point number represented in a binary form has a corresponding exponent, and the amount of computing resources consumed by the operation of adding the exponents of two floating point numbers is very small.

At block 230, the comparison module determines a maximum value among the first exponent value and the determined n second exponent values.

At block 240, it is determined as to whether a target second exponent value exists among the n second exponent values, an absolute value of a difference between the target second exponent value and the maximum value being greater than or equal to a first threshold. In a preferred embodiment of the present disclosure, the first threshold is the number of bits of the mantissa of the floating point number stored in the destination register 1043. In the case where the number of bits of the mantissa is 32, the first threshold is 32. In other embodiments of the present disclosure, an absolute value of a difference between the first threshold and the number of bits of the mantissa of the floating point number stored in the register is smaller than a second threshold. The second threshold can be set according to actual application situations. When a higher precision is required, the second threshold may be 0 or 1. In the case where the determined maximum value is 64 and then second exponent values are all 16, the absolute value of the difference between the maximum value and the second exponent value is 48, and greater than 32.

If it is determined at block 240 that the target second exponent value exists, the process proceeds to block 250. In response to determining that the target second exponent value exists in the n second exponent values, at block 250, a multiply operation of two floating point numbers corresponding to the target second exponent value is not performed in the processing unit, during the m+1$^{th}$ clock cycle. The number of target second exponent values may be any integer in a range of from 0 to n. In one example, the determined maximum value is 64, the first threshold is the number of reserved bits of the mantissa of the floating point number stored in the destination register 1043 and is 32, an absolute value of the difference between the second exponent value of only one data pair of n data pairs and the maximum value 64 is greater than or equal to 32, and then the add operation is not performed for the data pair. In one example, the determined maximum value is 64, the first threshold is the number of reserved bits of the mantissa of the floating point number stored in the destination register 1043 and is 32, the n second exponent values are all 16, and an absolute value of the difference between the maximum value and the second exponent value is 48, greater than 32. In this example, in the m+1$^{th}$ clock cycle, the multiply operation is not performed for all floating point numbers of the input third n-dimensional vector and fourth n-dimensional vector.

If it is determined at block 240 that the target second exponent value does not exist, the process proceeds to block 260. In response to determining that the target second exponent value does not exist among the n second exponent values, at block 260 the multiply operation is performed for all data in the two n-dimensional vectors in the processing unit, during the m+1$^{th}$ clock cycle. That is, in this case, in the m+1$^{th}$ clock cycle, the multiply operation of the corresponding two floating point numbers is performed for each data pair in the n data pairs formed by the two n-dimensional vectors input into the processing unit. In one example, the determined maximum value is 64, the first threshold is the number of reserved bits of the mantissa of the floating point number stored in the destination register 1043 and is 32, the n second exponent values are all 33, and an absolute value of the difference between the maximum value and the second exponent value is 31, smaller than 32. In this example, the multiply operation is performed for all floating point numbers of the input third n-dimensional vector and fourth n-dimensional vector.

In the method for processing data of the present disclosure, before the dot product operation of newly-input vectors is performed, it is first determined as to whether an absolute value of a difference between a sum of exponents of multiple pairs of data formed by these vectors and the determined maximum value is greater than or equal to the first threshold. If the absolute value is greater than the threshold, the multiply operation for the pair of data is neglected. Therefore, a lot of computing resources can be saved by the above-mentioned pre-determination. According to the statistics of the inventor of the present application, due to the large difference in the exponents of data, the multiply operation of 70% of the data in the field of artificial intelligence may be omitted through such pre-determination, so the computing resources can be saved to a rather large extent.

In the embodiments of the present disclosure, although it is described that the above pre-determination is performed in the m+1$^{th}$ cycle, this does not mean that the pre-determination is not performed in the m$^{th}$ cycle. The above pre-determination is also performed in the m$^{th}$ cycle, and the only thing is that the second exponent value therein is a sum of two exponents of a corresponding data pair of the first n-dimensional vector and second n-dimensional vector input therein, and the first exponent value is the first exponent value of the floating point number of the result of the operation performed in the m−1$^{th}$ cycle. Furthermore, at the exponent value of the floating point number of the result of the operation performed in the m+1$^{th}$ clock cycle is determined as the first exponent value for comparison with n second exponent values determined in the $m+2^{th}$ clock cycle, so as to find the maximum exponent value from the first exponent value and the n second exponent values in the $m+2^{th}$ clock cycle.

Example Device

Figure 3:
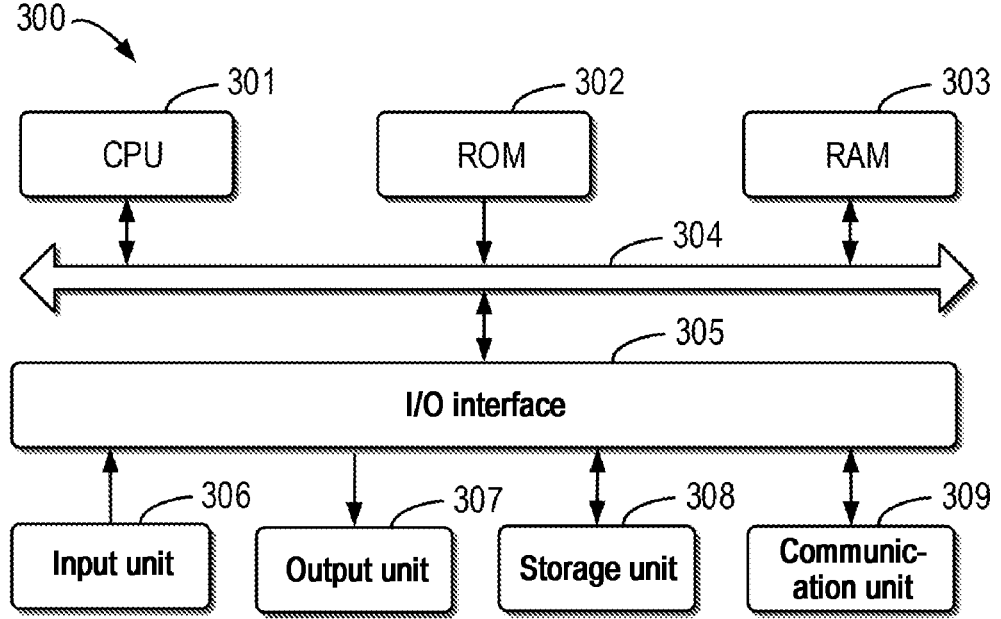
FIG. 3 illustrates a block diagram of a computing device capable of implementing a plurality of embodiments of the present disclosure.

FIG. 3 illustrates a block diagram of a computing device 300 capable of implementing embodiments of the present disclosure. For example, the device 300 may be used to implement the computing device 102 in FIG. 1. As shown in FIG. 3, the device 300 comprises a central processing unit (CPU) 301 that may perform various appropriate actions and processing based on computer program instructions stored in a read-only memory (ROM) 302 or computer program instructions loaded from a memory unit 308 to a random access memory (RAM) 303. In the RAM 303, there further store various programs and data needed for operations of the device 300. The CPU 301, ROM 302 and RAM 303 are connected to each other via a bus 304. An input/output (I/O) interface 305 is also connected to the bus 304.

Various components in the device 300 are connected to the I/O interface 305, including: an input unit 306 such as a keyboard, a mouse and the like; an output unit 307 including various kinds of displays and a loudspeaker, etc.; a storage unit 308 including a magnetic disk, an optical disk, and etc.; a communication unit 309 including a network card, a modem, and a wireless communication transceiver, etc. The communication unit 309 allows the device 300 to exchange information/data with other devices through a computer network such as the Internet and/or various kinds of telecommunications networks.

Various processes and processing described above, e.g., process 200 may be executed by the processor 301. For example, in some embodiments, the process 200 may be implemented as a computer software program that is tangibly included in a machine readable medium, e.g., the storage unit 308. In some embodiments, part or all of the computer program may be loaded and/or mounted onto the device 300 via ROM 302 and/or communication unit 309. When the computer program is loaded to the RAM 303 and executed by the CPU 301, one or more acts of the process 200 as described above may be executed. Alternatively, in other embodiments, CPU 301 may be configured to perform the process 200 in any other suitable manner (e.g., by means of firmware).

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A data processing method for systolic array, wherein the systolic array is an implementation of a general matrix multiply arithmetic logic unit and comprises a plurality of data processing units, each of the data processing units comprises a first source register, a second source register, a destination register and a calculation unit including a multiplier and an adder, a processor is used to control each of the data processing units for performing following steps, comprising:

in $m^{th}$ clock cycle, activating a timer to send a first clock control signal to the first source register and the second source register, so that in the $m^{th}$ clock cycle, the first source register inputs a first n-dimensional vector into the calculation unit which is a hardware logic component, and the second source register inputs a second n-dimensional vector into the calculation unit, performing a first dot product operation on the first n-dimensional vector and the second n-dimensional vector by the calculation unit, and determining a first exponent value of a floating point number of a result of the first dot product operation performed, and storing the first exponent value, where m is a positive integer greater than or equal to 1;

in m+1$^{th}$ clock cycle, activating the timer to send a second clock control signal to the first source register and the second source register, so that in the m+1$^{th}$ clock cycle, the first source register inputs a third n-dimensional vector into the calculation unit, and the second source register inputs fourth n-dimensional vector into the calculation unit, determining n second exponent values in the calculation unit, the second exponent values being obtained by adding the exponent of a floating point number in one of the third n-dimensional vector and the fourth n-dimensional vector with the exponent of a corresponding floating point number in the other of the two n-dimensional vectors, n being a positive integer greater than or equal to 1;

determining a maximum value among the first exponent value and the determined n second exponent values;

using a number of reserved bits of a mantissa of the floating point number stored in the destination register as a first threshold;

determining whether a target second exponent value exists among the n second exponent values, an absolute value of a difference between the target second exponent value and the maximum value being greater than or equal to the first threshold; and in response to determining that the target second exponent value exists in n second exponent values, sending a signal to the multiplier of the calculation unit to cause the multiplier to bypass a multiply operation of two floating point numbers corresponding to the target second exponent value, during the m+1$^{th}$ clock cycle.

2. The data processing method according to claim 1, wherein the processor is used to performing following steps, comprising: in response to determining that the target second exponent value does not exist among the n second exponent values, the multiply operation is performed for all data in the two n-dimensional vectors during the m+1$^{th}$ clock cycle.

3. The data processing method according to claim 1, wherein the data processing unit comprises the destination register; and an absolute value of a difference between the first threshold and the number of bits of the mantissa of the floating point number stored in the destination register is smaller than a second threshold.

4. The data processing method according to claim 1, wherein the first exponent value is obtained in the following manner:

in the m$^{th}$ clock cycle, performing the first dot product operation to obtain a floating point number of a first dot product operation result;

performing normalization processing for the floating point number of the first dot product operation result to obtain the first exponent value.

5. The data processing method according to claim 4, wherein performing the first dot product operation to obtain the floating point number of the first dot product operation result comprises:

multiplying i data from the first n-dimensional vector with corresponding i data from the second n-dimensional vector, respectively, to obtain i floating point numbers, where i=0, 1, 2 . . . n;

performing exponent matching processing on at least two floating point numbers among the i floating point numbers and the floating point numbers obtained by the dot product operation in m−1$^{th}$ clock cycle;

summing the exponent matching processed floating point numbers, to obtain a floating point number of the first dot product operation result in the m$^{th}$ clock cycle.

6. The data processing method according to claim 2, wherein the exponent value of the floating point number of the result of the operation performed in the m+1$^{th}$ clock cycle is determined as the first exponent value for comparison with the n second exponent values determined in m+2$^{th}$ clock cycle.

7. An electronic device, comprising:

a systolic array, comprising a plurality of data processing units, wherein each of the data processing units comprises a first source register, a second source register, destination register and a calculation unit including a multiplier and an adder, wherein the systolic array is an implementation of a general matrix multiply arithmetic logic unit;

a processor; and a memory coupled to the processor, the memory having instructions stored therein, wherein the processor is configured to execute the instructions to control each of the data processing units to:

in m$^{th}$ clock cycle, activate a timer to send a first clock control signal to the first source register and the second source register, so that in the m$^{th}$ clock cycle, the first source register inputs a first n-dimensional vector into the calculation unit which is a hardware logic component, and the second source register inputs a second n-dimensional vector into the calculation unit, perform a first dot product operation on the first n-dimensional vector and the second n-dimensional vector by the calculation unit, and determine a first exponent value of a floating point number of a result of the first dot product operation performed, and store the first exponent value, where m is a positive integer greater than or equal to 1;

in m+1$^{th}$ clock cycle, activate the timer to send a second clock control signal to the first source register and the second source register, so that in the m+1$^{th}$ clock cycle, the first source register inputs a third n-dimensional vector into the calculation unit, and the second source register inputs a fourth n-dimensional vector into the calculation unit, determine n second exponent values in the calculation unit, and store the n second exponent values, the second exponent values being obtained by adding the exponent of a floating point number in one of the third n-dimensional vector and the fourth n-dimensional vector with the exponent of a corresponding floating point number in the other of the two n-dimensional vectors, n being a positive integer greater than or equal to 1;

determine a maximum value among the first exponent value and the determined n second exponent values;

use a number of reserved bits of a mantissa of the floating point number stored in a destination register as a first threshold;

determine whether a target second exponent value exists among the n second exponent values, an absolute value of a difference between the target second exponent value and the maximum value being greater than or equal to the first threshold; and in response to determining that the target second exponent value exists in n second exponent values, send a signal to the multiplier of the calculation unit to cause the multiplier to bypass a multiply operation of two floating point numbers corresponding to the target second exponent value, during the m+1$^{th}$ clock cycle.

8. A non-transitory computer-readable storage medium having computer instructions stored thereon, the computer instructions, when executed by a machine, implementing the method according to claim 1.

\* \* \* \* \*